United States Patent [19]
Pond

[11] Patent Number: 4,561,298
[45] Date of Patent: Dec. 31, 1985

[54] VOLUME MEASUREMENT SYSTEM

[76] Inventor: John B. Pond, 216 Prospect Rd., Farnborough, GU14 8SZ, England

[21] Appl. No.: 626,063

[22] Filed: Jun. 29, 1984

[30] Foreign Application Priority Data

Jun. 30, 1983 [GB] United Kingdom ............... 8317888

[51] Int. Cl.$^4$ ............................................. G01F 17/00
[52] U.S. Cl. .................................................. 73/149
[58] Field of Search ................. 73/149, 290 B, 290 V

[56] References Cited

U.S. PATENT DOCUMENTS 3,075,382  1/1963  Mathias .
3,237,451  3/1966  Haeff ................................... 73/149
4,474,061 10/1984  Parker ............................. 73/290 B

FOREIGN PATENT DOCUMENTS 8302001  6/1983  PCT Int'l Appl. .

Primary Examiner—S. Clement Swisher
Attorney, Agent, or Firm—Merchant, Gould, Smith, Edell, Welter & Schmidt

[57] ABSTRACT

A method of, and apparatus for, measuring the free volume of a confined space or container is described. The method comprises applying to the gas or vapor within the confined space or container repeated compressions of predetermined waveform by means of a barrier or diaphragm; generating electrical signals representative of the resultant variation of pressure within the confined space or container; repeatedly sampling said electrical signals at regular predetermined instants, or over regular predetermined time ranges, corresponding to predetermined points or regions of said waveform; combining or integrating the sampled signals to generate thereby a time-averaged output signal; and calculating the free volume of the confined space or container from the output signal thus obtained. In one embodiment, the apparatus comprises (1) diaphragm means, for applying repeated compressions to said confined space or container; (2) drive means for moving said diaphragm means in accordance with a predetermined waveform; (3) a pressure-sensitive transducer for measuring pressure changes within the volume which is itself to be measured; (4) electrical circuit means connected to said pressure-sensitive transducer and to said drive means, for sampling the electrical output of said pressure-sensitive transducer at predetermined times related to the frequency at which the diaphragm means is driven and for generating a time-averaged output signal from the signals generated by said electrical circuit means; and (5) means for determining from said time-averaged output signal a value representative of the free volume being measured.

20 Claims, 5 Drawing Figures

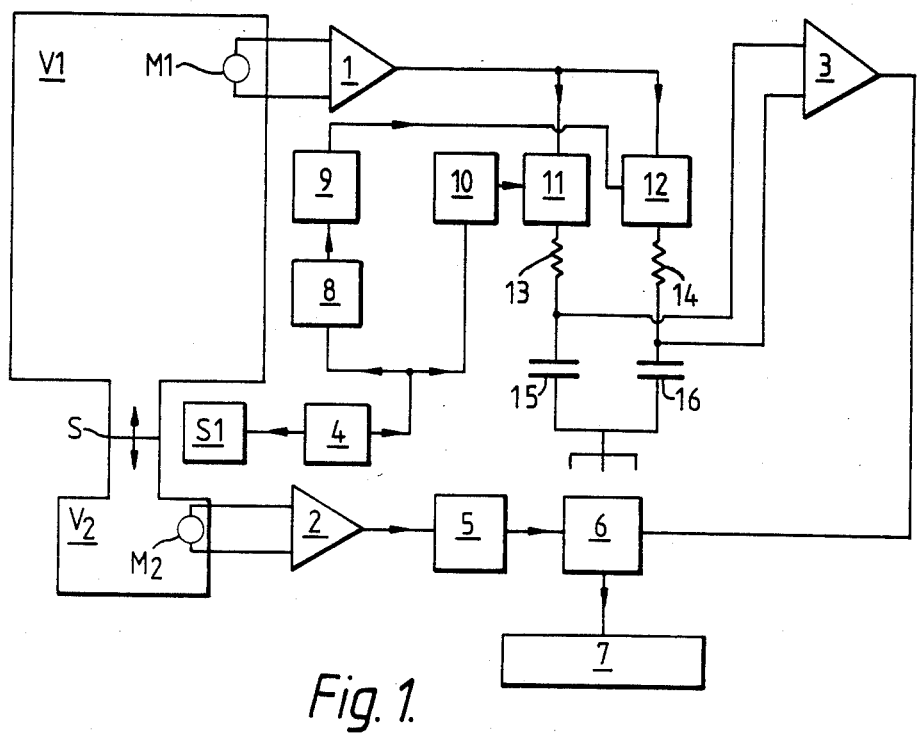
Fig. 1.
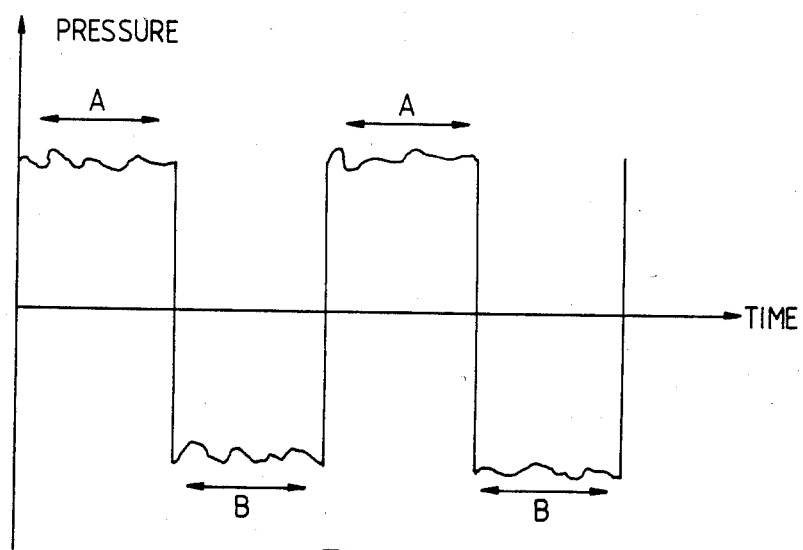
Fig. 1.A.

Fig. 2.A.

VOLUME MEASUREMENT SYSTEM

This invention relates to a method of, and apparatus for, measuring the free (that is gaseous or vapourous) volume within a confined space or a container. One technique for effecting such measurements is by compressing the volume and considering the resultant pressure change. An example of this technique is disclosed in U.S. Pat. No. 3,237,451 dated Mar. 1, 1966. Many potential applications of this technique, however, are prevented by the problem of noise which is too great simply to be removed by the use of filters. Noise arises from a variety of sources. There is the electrical noise associated with the conversion of the pressures undergoing monitoring into electrical signals, and with the amplification and subsquent processing of those signals (termed hereinafter "the wanted signals"). Such electrical noise appears as unwanted signals added to the wanted signals and may be produced by the measurement system itself (self-generated electrical noise) or by electrical or magnetic influence from the suroundings (pickup electrical noise).

There is also noise which, although eventually appearing as unwanted electrical signals, has its origin in pressure fluctuations or mechanical vibrations caused by the measurement system itself (self-generated acoustic noise) or by influence from the surroundings (pickup acoustic noise). In many instances, the magnitude of the noise is so great that it tends to swamp the wanted signals. Filtering techiques are inadequate to cope with such situations and can, in practice, lead to a deterioration in the eventual output signal since successive filtering stages tend to add their own noise to the original signal and are thereby self-defeating.

Noise may also be defined as locked or non-locked. Locked noise is the acoustic or electrical noise present as a by-product of the intentional pressure changes and hence has a definite time relationship with these pressure changes. Because of this relationship, it is often not difficult to reduce a problem of locked noise. Non-locked noise is not related in this way to the intentional pressure changes and, in many potential applications of the technique under consideration, can be an insuperable problem.

Where the volume to be measured is very large so that the intentional pressure changes are of necessity very slight with the result that the required electrical signals need large amplification, unavoidable self-generated noise obscures the wanted signals. Also, in some applications, pickup noise may be much greater than the wanted signals even when these can themselves be made quite large. Various systems have been suggested to reduce the problem of noise, for example that described in USSR Pat. No. SU678,316 dated Aug. 29, 1979, but in many potential applications this problem has still remainded intractable.

The present invention aims to reduce the problem of noise when measuring a volume by the technique involving compression of the volume and consideration of the resultant pressure change.

According to one aspect of the present invention, there is provided a method of measuring the free volume within a confined space or a container, which comprises applying to the gas or vapour within the confined space or container repeated compressions of predetermined waveform by means of a barrier or diaphragm; generating electrical signals representative of the resultant variation of pressure within the confined space or container; repeatedly sampling said electrical signals at regular predetermined instants, or over regular predetermined time ranges, corresponding to predetermined points or regions of said waveform; combining or integrating the sampled signals to generate thereby a time-averaged output signal; and calculating the free volume of the confined space or container from the output signal thus obtained.

The method of the invention makes the wanted signals repetitive and selects the timing of signal sampling with respect to the timing of the signals themselves so that, when the signals are combined or integrated, the effect of noise is relatively diminished.

The container or confined space whose volume is to be measured will generally be filled with a gas or vapour, for example with air or with a mixture of air and petroleum vapour. The frequency of the repeated compressions will generally be constant while measurements are being taken, but it is possible and may be advantageous to perform a sweep through a frequency range prior to taking measurements in order to select a frequency with a view to optimising noise reduction. The selected frequency will be a function of the size of the volume being measured, large volumes using lower frequencies and vice versa. The frequency must be sufficiently low to prevent the occurrence of standing waves, and low enough to avoid problems associated with Helmholtz resonance. In general, the frequency should be sufficiently low for the pressure response to tend towards equilibrium within the volume concerned. Given this condition, higher frequencies are more advantageous than lower ones because of the greater ease of eliminating noise from the wanted signals. Typically, a volume of about 1 cubic meter can be measured accurately with a frequency of about 30 Hz, while a volume of about 100 cubic meters can be measured accurately with a frequency of around 3 Hz.

The source of repeated compressions can conveniently be in the form of an electrically-driven diaphragm. In order to allow equilibration of the static pressure across the diaphragm, there is advantageously provided means, e.g. a small by-pass duct or a hole in the diaphragm, which facilitates such equilibration while maintaining acoustic (or sub-acoustic) separation between the gases or vapours on opposite sides of the diaphragm.

The presently preferred waveform of the repeated compressions is a square wave profile.

The resultant variation of pressure within the confined space or container can be measured by a suitable pressure-sensitive device, for example a microphone sensitive to low frequencies. This can be used to give an electrical output which is directly proportional to pressure variation within the volume undergoing measurement.

The repeated sampling of signals related to the pressure variations in the unknown volume can be effected using circuitry incorporating one or more triggers which respond to the waveform of applied compressions and which actuate one or more switches which act to pass the signals to further processing circuitry. Where a square wave drive is applied to the diaphragm, the signal sampling advantageously commences a short time after the diaphragm has reached the limit of its movement, whether in the forward or in the rearward directions; this may be accomplished by appropriate delay circuitry, and has the advantage that any initial pressure fluctuations, caused for example by Helmholtz resonance, are ignored by the signal sampling arrangement.

In one embodiment of the invention, the diaphragm is positioned so that one face thereof applies repeated compressions to the volume undergoing measurement, while the opposite face of the diaphragm applies repeated compression (of opposite phase) to a reference volume, e.g. a small chamber of known volume. This reference volume is preferably small, e.g. of the order of from 10 to 100 cubic centimeters. Pressure variations in both the unknown and reference volumes are used to generate electrical signals, e.g. by use of pickup transducers such as microphones, positioned so as to respond to those pressure changes, and the signals are processed as described above. Since noise is unlikely to be a serious problem with respect to the signals related to the reference volume, these signals may be rectified instead of being subject to the sampling and time-averaging technique which is used for the signals related to the unknown volume.

According to another aspect of the present invention, there is provided apparatus for measuring the free volume within a confined space or a container, which apparatus comprises (1) diaphragm means, for applying repeated compressions to said confined space or container; (2) drive means for moving said diaphragm means in accordance with a predetermined waveform; (3) a pressure-sensitive transducer for measuring pressure changes within the volume which is itself to be measured; (4) electrical circuit means connected to said pressure-sensitive transducer and to said drive means, for sampling the electrical output of said pressure-sensitive transducer at predetermined times related to the frequency at which the diaphragm means is driven and for generating a time-averaged output signal from the signals generated by said electrical circuit means; and (5) means for determining from said time-averaged output signal a value representative of the free volume being measured.

Advantageously, the electrical circuit means comprises a first averaging element which is connected to said transducer only during times (or parts thereof) of maximum diaphragm excursion in one direction, and a second averaging element which is connected to said transducer only during times (or parts thereof) of maximum diaphragm excursion in the opposite direction, together with means for determining the difference between the outputs of said first and said second averaging elements, said outputs representing, respectively, first and second averaged signals derived from the response of said free volume to said repeated compressions.

According to a further aspect of the invention, there is provided apparatus for measuring the free volume within a confined space or a container, which apparatus comprises (1) diaphragm means, for applying repeated compressions to said confined space or container; (2) a chamber of known volume supporting said diaphragm means; (3) drive means for moving said diaphragm means in accordance with a predetermined waveform; (4) means for allowing equilibration of the static pressures across said diaphragm means while maintaining acoustic separation across the diaphragm means; (5) a first, pressure-sensitive transducer for measuring pressure changes within the volume which is itself to be measured; (6) a second, pressure-sensitive transducer for measuring pressure changes within said chamber of known volume; (7) electrical circuit means connected to said first pressure-sensitive transducer and to said drive means, for sampling the electrical output of said first, pressure-sensitive transducer at predetermined times related to the frequency at which the diaphragm means is driven and for generating a time-averaged output signal from the signals generated by said electrical circuit means; (8) means for generating a second output signal from the second, pressure-sensitive transducer; and (9) comparator means for comparing said time-averaged output signal derived from the first, pressure-sensitive transducer with the second output signal derived from said second, pressure-sensitive transducer.

The comparator means preferably comprises a logic element which can be programmed to perform calculations and comparisons necessary to give an output directly indicative of the value of the unknown free volume, and/or to calculate an associated parameter (such as the state of fill of the container), given an appropriate input of data (such as the free volume of the container when it is empty). The apparatus advantageously further includes display means responsive to the output of said comparator means. Such display means is preferably an alphanumeric display and can be arranged to display warnings and/or instructions to the user.

The diaphragm means can be a moving coil loudspeaker mounted in a duct forming part of, and communicating with the main volume of, said chamber of known volume.

The means for allowing static pressure equilibration across the diaphragm means can be, for example, a small hole in the diaphragm itself or a fine-bore duct by-passing the diaphragm.

The presently preferred electrical drive means for the diaphragm is a square wave generator.

In one embodiment, the apparatus of this invention is in portable form and comprises a duct which is intended to couple onto the volume which is to be measured; the duct forms an extension from the chamber of known volume and can terminate, for example, with an O-ring seal. Within the duct are located the diaphragm which imparts repeated compressions to the unknown volume and to the reference volume, and the pressure-sensitive transducer for generating an electrical signal related to the unknown volumes. The reference chamber may include within it the second transducer for generating electrical signals related to the reference volume.

For a better understanding of the invention, and to show how the same may be carried into effect, reference will now be made, by way of example, to the accompanying drawings, in which:

FIG. 1 illustrates schematically one embodiment of apparatus in accordance with the invention;

FIG. 1A illustrates the variation of pressure with time within a container whose free volume is being measured using the apparatus of FIG. 1;

FIG. 2A shows another arrangement of the apparatus as a portable unit; and

Figure 2:
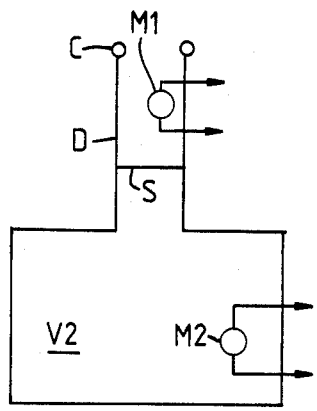
FIG. 2 illustrates schematically how apparatus of the invention may be arranged as a portable unit.

Referring to FIG. 1, the volume to be measured, V1, is given periodic compressions by the movements of S which is the diaphragm of a moving coil loudspeaker mounted between V1 and a reference volume V2 and whose driving coil (indicated schematically as S1) is fed from a square wave generator 4. Thus S also gives related compressions to V2. A first, pressure-sensitive transducer in the form of a microphone M1 is located within the volume V1 and a second, pressure-sensitive transducer in the form of a microphone M2 is located within the chamber V2 of known volume. The output of microphone M1 is amplified by an amplifier 1, the output of which is fed to elements 11 and 12 which are components of two arms, in parallel, of a signal rectifying/averaging circuit. Square wave generator 4 also feeds into this circuit, which includes timing/pulsing elements 9 and 10 and an invertor 8 connected between generator 4 and element 9. Elements 11 and 12 are connected, respectively, to elements 10 and 9 and function as variable conductance elements, e.g. switches (where the conductance is effectively varied from zero to infinity). In one arrangement, each of elements 9 and 10 is a differentiating element, e.g. Schmidt trigger device which, in response to the square waves generated by 4, generates pulses which alternately energise or de-energise the switch (11 or 12) to which it is connected. In this way, switch 11 is only ON at times when (or part thereof) when diaphragm S is at the limit of its movement in one direction, and switch 12 is ON only at times (or part thereof) when diaphragm S is at the limit of its movement in the opposite direction. Switch 12 is OFF whenever 11 is ON, and switch 11 is OFF whenever 12 is ON. Elements 13 and 14 are resistances, and 15 and 16 are capacitances. Elements 8, 9, 10, 11, 12, 13, 14, 15 and 16 perform a signal rectification function as well as a signal averaging function. Elements 13, 14, 15 and 16 can be realised electronically, as can the other circuit elements, and can be adjustable. The inputs to a differential amplifier 3 are connected through the resistances 13 and 14 to elements 11 and 12, respectively.

The time profile of the pressure in V1 is somewhat as shown in FIG. 1A where for clarity a constant pressure (the static pressure), usually much greater than the pressure variation, has been subtracted. For clarity, acoustic noise is shown as a small disturbance on the roots (minima) and crests (maxima) of the wave; in many instances, the amplitude of the noise will in fact greatly exceed that of the applied compressions, being of such a magnitude that it cannot be handled by the mere use of filters.

After conversion of the pressure signals into electrical signals by M1 and their amplification by 1 there is obtained an electrical signal similar in principle in time profile to that shown in FIG. 1A (given that in FIG. 1A the amplitude of the noise is reduced by a large factor for clarity of presentation) but with added electrical noise. Invertor 8 and timing/pulsing elements 9 and 10 alter the electrical conductances of elements 11 and 12 so that essentially resistance 13 is connected to the signals from 1 during definite parts (shown as A) of the crests and 14 is connected during parts (shown as B) of the roots. While A and B can occupy all of the crests and roots respectively in simpler versions of the apparatus, decreasing A and B can help to reduce locked noise.

Thus the output of amplifier 3 is a voltage related more and more closely to the difference of averages of root and crest pressure as the number of samples A and B taken increases. The waiting time for an acceptable average (which may be shown by a relatively steady voltage from 3) may be reduced by altering the electric charges in 15 and 16 by known means (not shown).

The voltage from 3 is led to a comparator/logic element 6 to be compared with a voltage which may be derived in an analogous manner from the pressure changes in V2. In the illustrated version of the apparatus which is adequate where noise in the signals from V2 is not a problem, the signals from V2 are rectified by element 5 without averaging. It will be appreciated that rectifying element 5 may be replaced by a circuit analogous to that comprising elements 3, 8, 9, 10, 11, 12, 13, 14, 15 and 16.

The comparison of signals to lead to the measurement of volume may be done by analogue or digital means. In the version shown here comparator 6 contains analogue to digital convertors and calculator logic so that the voltages from V1 and V2 may be made into a ratio, multiplied by desired constants and subtracted from desired constants. 7 is an alphanumeric display so that information about the state of fill of a container may be displayed.

FIG. 2 illustrates a portable version of the apparatus. The electronics are not shown. In the prior art, volume measurement systems employing pressure changes are not considered as portable and versatile instruments which can be coupled to different containers as and when required. FIG. 2 shows an arrangement which can be so used. A duct D couples at C on to an orifice on the container. The exact nature of the coupling is not important as long as it is reasonably gas tight; the orifice can even be an adventitious hole. M1 and S both couple into the duct rather than into V1 itself. A volume V1 may also be measured with the portable apparatus taken right inside it.

FIG. 2A shows an alternative portable arrangement, intended for use in measuring relatively large volumes, and in which duct D is dimensioned as shown and is relatively squat. Diaphragm S occupies all or substantially all of the width of duct D.

Figure 3:
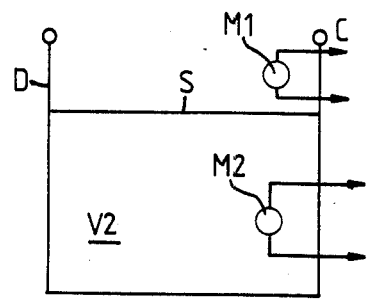
FIG. 3 illustrates a variation in part of the apparatus shown in FIG. 2.
Figure 3:
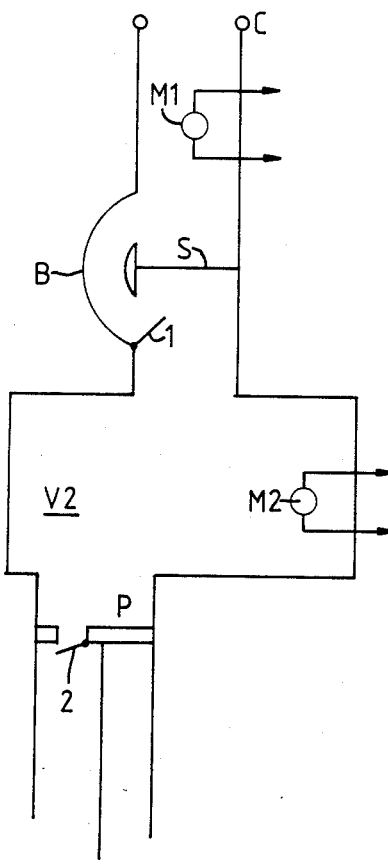

FIG. 3 illustrates a modification of the apparatus of FIG. 2 in which provision is made for the flushing out of the interior of reference chamber V2 with gases or vapours from the interior of the volume which is to be measured. The principle is that a pump (shown here as a piston P together with non-return valves 1 and 2) can operate to expel gas/vapour from V2 and draw in fresh gas/vapour from V1. Some by-pass to S is required and this is shown diagrammatically as B. Some means of preventing by-pass during the induction of pressure changes is required. This can be achieved for example by strong springs on 1 and 2. The reason for flushing and replacement is to equalise the nature and hence the compressibilities of the gas/vapour contents of V1 and V2. This is important in some applications and is particularly so with a portable instrument.

I claim:

1. A method of measuring the free volume within a confined space, which comprises applying to the gas within the confined space repeated compressions of predetermined waveform by means of an electrically driven diaphragm one face of which is coupled to said free volume and the other face of which is coupled to a second, known volume; generating first electrical signals representative of the resultant variation of pressure within the confined space; repeatedly sampling said first electrical signals during moments of maximum diaphragm excursion; integrating the sampled signals to generate thereby a time-averaged first output signal; generating second electrical signals representative of the resultant pressure variation in said second, known volume; averaging said second electrical signals to generate a second ouput signal; and calculating the free volume of the confined space from the first and second output signals thus obtained.

2. A method according to claim 1, wherein a moving coil loudspeaker is used to apply said repeated compressions.

3. A method according to claim 1, wherein the electrical signals representative of pressure variations within the volume being measured are generated by a pickup transducer sensitive to low frequencies.

4. A method according to claim 3, wherein said pickup transducer is a microphone.

5. Apparatus for measuring the free volume within a confined space, which apparatus is portable in form and comprises (1) diaphragm means, for applying repeated compressions to said confined space; (2) a chamber of known volume; (3) a duct communicating with and acting as an extension of said chamber of known volume, and supporting within it said diagraphm means; (4) at that end of said duct remote from said chamber of known volume, a coupling attachment for attachment to the volume which is to be measured; (5) drive means for moving said diaphragm means in accordance with a predetermined waveform; (6) a first pressure-sensitive transducer for measuring pressure changes within the volume which is itself to be measured; (7) a second pressure-sensitive transducer for measuring pressure changes within said chamber of known volume; (8) electrical circuit means connected to said first pressure-sensitive transducer and to said drive means, for sampling the electrical output of said first pressure-sensitive transducer at predetermined times related to the frequency at which the diaphragm means is driven and for generating a time-averaged output signal from the signals generated by said first pressure-sensitive transducer; and (9) means for determining from said time-averaged output signal and from the responses of said second pressure-sensitive transducer a value representative of the free volume being measured.

6. Apparatus as claimed in claim 5, wherein said electrical circuit means comprises a first averaging element which is connected to said transducer only during times of maximum diaphragm excursion in one direction, and a second averaging element which is connected to said transducer only during times of maximum diaphragm excursion in the opposite direction, together with means for determining the difference between the outputs of said first and said second averaging elements, said outputs representing, respectively, first and second averaged signals derived from the response of said free volume to said repeated compressions.

7. Apparatus as claimed in claim 6, wherein said electrical circuit means further comprises a logic element which is arranged to calculate a parameter indicative of said free volume, from the difference between said output signals derived from said first transducer and from the output signal derived from said second transducer.

8. Apparatus for measuring the free volume within a confined space, which apparatus comprises (1) diaphragm means, for applying repeated compressions to said confined space or container; (2) a chamber of known volume supporting said diaphragm means; (3) drive means for moving said diaphragm means in accordance with a predetermined waveform; (4) means for allowing equilibration of static pressures across said diaphragm means while maintaining acoustic separation across the diaphragm means; (5) a first, pressure-sensitive transducer for measuring pressure changes within the volume which is itself to be measured; (6) a second, pressure-sensitive transducer for measuring pressure changes within said chamber of known volume; (7) electrical circuit means connected to said first pressure-sensitive transducer and to said drive means, for sampling the electrical output of said first, pressure-sensitive transducer at predetermined times related to the frequency at which the diaphragm means is driven and for generating a time-averaged output signal from the signals generated by said electrical circuit means; (8) means for generating a second output signal from the second, pressure-sensitive transducer; and (9) comparator means for comparing said time-averaged output signal derived from the first, pressure-sensitive transducer with the second output signal derived from said second, pressure-sensitive transducer, and wherein said electrical circuit means comprises a first averaging element which is connected to said first transducer only during moments of maximum diaphragm excursion is one direction, and a second averaging element which is connected to said first transducer only during moments of maximum diaphragm excursion in the opposite direction, together with means for determining the difference between the outputs of said first and second averaging elements, said outputs representing, respectively, first and second averaged signals derived from the response of said free volume of said repeated compressions; and wherein said comparator comprises a logic element which is arranged to calculate a value indicative of said free volume from the difference between said output signals derived from said first transducer and from the ouput signal derived from said second transducer.

9. Apparatus as claimed in claim 8, which further comprises display means responsive to the output of said comparator means.

10. Apparatus as claimed in claim 5, which further comprises a logic element and means for input of data to the logic element, the logic element being arranged to calculate from the determined value of the free volume and from data supplied via the data input means a parameter related to the free volume of the confined space.

11. Apparatus as claimed in claim 10, wherein said logic element is arranged to calculate the state of fill a container which, together with its contents define said confined space.

12. Apparatus as claimed in claim 8 which is in portable form and which further comprises a duct communicating with said chamber of known volume, said duct acting as an extension of said chamber and supporting within it said diaphgram means, wherein (a) the duct terminates in a coupling for attachment to the volume which is to be measured; and (b) said first, pressure-sensitive transducer is arranged and located so as to detect pressure variations within said duct between the diaphragm means and said coupling.

13. Apparatus as claimed in claim 12 which further includes means for flushing out the contents of said chamber of known volume.

14. Apparatus as claimed in claim 13 which comprises a by-pass duct located as a by-pass around said diaphragm means; a one-way valve located in said by-pass duct so as to admit gases or vapours from upstream of the diaphragm means into the chamber of known volume downstream of the diaphragm means; and a pump for withdrawing gas or vapour from said chamber of known volume.

15. Apparatus as claimed in claim 5 wherein said drive means for moving said diaphragm means in accordance with a predetermined waveform is a square wave generator.

16. Apparatus as claimed in claim 5, which comprises a by-pass duct located as a by-pass around said diaphragm means; a one-way valve located in said by-pass duct so as to admit gases or vapours from upstream of the diaphragm means into the chamber of known volume downstream of the diaphragm means; and a pump for withdrawing gas or vapour from said chamber of known volume.

17. Apparatus for measuring the free volume within a confined space which apparatus comprises (1) diaphragm means, for applying repeated compressions to said confined space or container; (2) drive means for moving said diaphragm means in accordance with a predetermined waveform; (3) a pressure-sensitive transducer for measuring pressure changes within the volume which is itself to be measured; (4) electrical circuit means connected to said pressure-sensitive transducer and to said drive means, for sampling the electrical output of said pressure-sensitive transducer at predetermined times related to the frequency at which the diaphragm means is driven and for generating a time-averaged output signal from the signals generated by said electrical circuit means; and (5) means for determining from said time-averaged output signal a value representative of the free volume being measured, said electrical circuit means comprising a first averaging element which is connected to said transducer only during times of maximum diaphragm excursion in one direction, and a second averaging element which is connected to said transducer only during times of maximum diaphragm excursion in the opposite direction, together with means for determining the difference between the outputs of said first and said second averaging elements, said outputs representing, respectively, first and second averaged signals derived from the response of said free volume to said repeated compressions.

18. A portable Apparatus for measuring the free volume within a confined space, which apparatus comprises (1) diaphragm means, for applying repeated compressions to said confined space or container; (2) a chamber of known volume supporting said diaphragm means; (3) drive means for moving said diaphragm means in accordance with a predetermined waveform; (4) means for allowing equilibration of static pressures across said diaphragm means while maintaining acoustic separation across the diaphragm means; (5) a first, pressure-sensitive transducer for measuring pressure changes within the volume which is itself to be measured; (6) a second, pressure-sensitive transducer for measuring pressure changes within said chamber of known volume; (7) electrical circuit means connected to said first pressure-sensitive transducer and to said drive means, for sampling the electrical output of said first, pressure-sensitive transducer at predetermined times related to the frequency at which the diaphragm means is driven and for generating a time-averaged ouput signal from the signals generated by said electrical circuit means; (8) means for generating a second output signal from the second, pressure-sensitive transducer; and (9) comparator means for comparing said time-averaged ouput signal derived from the first, pressure-sensitive transducer with the second ouput signal derived from said second, pressure-sensitive transducer, a duct communicating with said chamber of known volume, said duct acting as an extension of said chamber and supporting within it said diaphragm means, wherein (a) the duct terminates in a coupling for attachment to the volume which is to be measured, and (b) said first, pressure-sensitive transducer is arranged and located so as to detect pressure variations within said duct between the diaphragm means and said coupling.

19. Apparatus as claimed in claim 18 including means for flushing out the contents of said chamber of known volume and a by-pass duct located as a by-pass around said diaphragm means; a one-way valve located in said by-pass duct so as to admit gases or vapours from upstream of the diaphragm means into the chamber of known volume downstream of the diaphragm means; and a pump for withdrawing gas or vapour from said chamber of known volume.

20. Apparatus for measuring the free volue within a confined space which apparatus comprises (1) diaphragm means, for applying repeated compressions to said confined space or container; (2) drive means for moving said diaphragm means in accordance with a squarewave waveform; (3) a pressure-sensitive transducer for measuring pressure changes within the volume which is itself to be measured; (4) electrical circuit means connected to said pressure-sensitive transducer and to said drive means, for sampling the electrical output of said pressure-sensitive transducer at predetermined times related to the frequency at which the diaphragm means is driven and for generating a time-averaged output signal from the signals generated by said electrical circuit means; and (5) means for determining from said time-averaged ouput signal a value representative of the free volume being measured.

* * * * *